United States Patent [19]

Longabaugh

[11] Patent Number: 4,636,949
[45] Date of Patent: Jan. 13, 1987

[54] METHOD AND APPARATUS FOR CONTROLLING COOKING CYCLES IN A COOKING SYSTEM

[75] Inventor: Charles R. Longabaugh, Hazleton, Ind.

[73] Assignee: AMF Incorporated, White Plains, N.Y.

[21] Appl. No.: 587,004
[22] Filed: Mar. 7, 1984
[51] Int. Cl.[4] .............. G06F 15/20; G05B 11/01; A47J 27/62; F27D 11/00
[52] U.S. Cl. .................. 364/400; 364/143; 364/146; 364/192; 364/154; 364/184; 364/557; 99/327; 99/332; 219/442; 219/492; 219/494
[58] Field of Search ............... 364/143–146, 364/400, 192, 477, 557, 154, 184, 185; 99/325–328, 332; 219/10.55 B, 10.55 E, 442, 490, 492, 494

[56] References Cited

U.S. PATENT DOCUMENTS

| 3,466,997 | 9/1969 | Hartzog | 99/330 |
|---|---|---|---|
| 3,655,411 | 4/1972 | Albright | 99/330 |
| 3,734,744 | 5/1973 | Albright | 99/107 |
| 3,821,516 | 6/1974 | Hayes et al. | 219/497 |
| 3,904,852 | 9/1975 | Rivelli et al. | 219/442 |
| 3,932,723 | 1/1976 | Tamano et al. | 219/10.35 B |
| 3,950,632 | 4/1976 | Rivelli | 219/523 |
| 3,955,067 | 5/1976 | Eldridge | 219/497 |
| 3,969,703 | 3/1976 | Kwiantkowski et al. | 364/144 |
| 3,979,056 | 9/1976 | Barnes | 235/92 MT |
| 4,054,778 | 10/1977 | Wollich | 219/413 |
| 4,077,690 | 3/1978 | Koether | 339/89 R |
| 4,156,454 | 5/1979 | Skals | 165/2 |
| 4,197,581 | 4/1980 | Watrous et al. | 364/400 |
| 4,200,910 | 4/1980 | Hall | 364/146 |
| 4,223,379 | 9/1980 | Simcoe | 364/400 |
| 4,246,955 | 1/1981 | Skala | 165/26 |
| 4,278,872 | 7/1981 | Koether et al. | 219/497 |
| 4,282,423 | 8/1981 | Volz | 219/490 |
| 4,301,509 | 11/1981 | Haase et al. | 364/557 |
| 4,309,584 | 1/1982 | Terakami | 219/10.55 B |
| 4,320,285 | 3/1982 | Koether | 219/497 |
| 4,328,539 | 5/1982 | Heeger | 364/144 |
| 4,336,433 | 6/1982 | Yokozeki | 219/10.55 B |
| 4,345,132 | 7/1982 | Takase et al. | 219/10.55 B |
| 4,345,145 | 8/1982 | Norwood | 219/492 |
| 4,349,715 | 9/1982 | Mariyama | 219/10.55 B |
| 4,356,370 | 10/1982 | Horinouchi | 219/10.55 B |
| 4,365,289 | 12/1982 | Small et al. | 364/144 |
| 4,388,692 | 6/1983 | Jones et al. | 364/557 |
| 4,390,965 | 6/1983 | Albert | 364/400 |
| 4,409,662 | 10/1983 | Rao | 364/557 |
| 4,412,284 | 10/1983 | Kerforne et al. | 371/66 |
| 4,437,159 | 3/1984 | Waugh | 364/400 |
| 4,499,357 | 2/1985 | Kojima | 99/325 |
| 4,503,502 | 3/1985 | Chapin | 364/400 |
| 4,517,429 | 5/1985 | Horinouchi | 99/325 |

Primary Examiner—Jerry Smith
Assistant Examiner—John R. Lastova
Attorney, Agent, or Firm—Willian Brinks Olds Hofer Gilson & Lione

[57] ABSTRACT

Method and apparatus for controlling the operation of a commercial deep-fryer cooker as used in preparing fried chicken or other food products. The controller (11), according to the invention, has been designed to control essentially all aspects of the cooking process and includes a number of features which enhance the flexibility of the system, allow it to be operated with greater efficiency and provide increased safeguards against accident or machine malfunction.

Among the features provided by the invention is the capability of lengthening or shortening or changing the ending temperature of a cooking cycle without changing the overall cooking cycle. This permits fast changes to be made in a cooking cycle, even while it is in progress.

The system also provides protection against a power failure by saving essential data relating to an interrupted cooking cycle so that the cycle can be resumed if the power is restored within a prescribed period of time.

The system also provides for more efficient heat regulation, provides safeguards when cooking under pressure to significantly reduce the risk of accident, provides means for preventing cooking cycle programs from being entered improperly, and includes a variety of built-in diagnostic capabilities to ensure everything is working properly and to notify the operator of a malfunction.

17 Claims, 27 Drawing Figures

METHOD AND APPARATUS FOR CONTROLLING COOKING CYCLES IN A COOKING SYSTEM

DESCRIPTION

1. Technical Field

The present invention relates generally to a deep-fryer cooker for preparing fried chicken or other food products. More particularly, the invention relates to a deep-fryer cooker that can be easily operated by relatively unskilled personnel and to a method and apparatus that provides greater capability in managing the overall operation of the cooker and enhanced protection against operator injury, equipment failure and food spoilage.

2. Background Art

Large, commercial size, deep-fryer cookers are used in restaurants and other establishments to prepare a variety of food products. For example, a particularly large user of such cookers is the so-called "fast food" restaurant where they are often used to prepare fried chicken, fish, potatoes, and other foods.

In such establishments, the employees are frequently quite young and relatively unskilled; and as a result, it is important that the cooker be easy to operate without requiring a significant amount of operator training. In addition, notwithstanding the possible inexperience of the operator, it is imperative that the fried chicken or other food be prepared properly and in a consistent manner at all times. This is especially important in the fast-food business where a particular restaurant may have hundreds or even thousands of outlets and require that its foods be prepared in a similar manner at each location.

For these and other reasons, deep-fryer cookers of the type to which the present invention is directed have been designed so that many of the operations that must be performed to produce a consistent, properly cooked, food product are done substantially automatically under the control of an electronic controller. For example, some activities that are commonly carried out by currently used controllers include transferring cooking oil from a reservoir to a cookpot; advising the operator when the uncooked food should be placed into the cookpot; monitoring and controlling the conditions within the cookpot (e.g., the temperature of the cooking oil and the pressure within the pot); initiating or terminating each phase of the desired cooking cycle at the proper time; and/or upon the occurrence of the proper set of conditions, notifying the operator when the cooking process is completed so that the cooked food may be removed from the cookpot; and preparing the cooker for receipt of the next supply of food to be prepared.

The deep-fryer cookers which are currently known in the prior art, however, are not fully satisfactory for a number of reasons. For one thing, many available systems are quite limited in both the number of cooking cycles that can be performed and in their complexity. The availability of a relatively large number of cooking cycles is desirable because many establishments use the same cooker to prepare a number of different food products or to prepare the same food product in several different ways. For example, in the case of fried chicken, the product can be cooked to different degrees of crispness, or it can be prepared under pressurized or non-pressured cooking conditions. Also it might be desirable to cook different portions of the chicken, such as the breasts or the drumsticks, in different ways. Furthermore, it is often desirable to vary the amount of a particular food product that is to be cooked; and for optimum results, different cooking cycles should usually be used for different sized cooker loads.

The capability of handling relatively complex cooking cycles is also important for a number of reasons. In cooking chicken, for example, to obtain a soft and moist product, the temperature of the cooking cycle must start relatively high and end relatively low, but not drop below a certain limit. Also, during the low temperature portion of the cycle, the temperature cannot be allowed to vary by more than a very few degrees or too much cooking oil may be absorbed into the chicken. In addition, in order to get the proper color in the chicken, browning must occur, but only for a limited period of time or the edges will be too crisp. To prepare a crisp product, on the other hand, the temperature must start out high and remain high for the entire cooking cycle.

Since the person who programs the various cooking cycles into the controller is usually not the same person who operates the cooker, it is important that the controller have the capacity for storing all the different cooking cycles that might be needed and also be able to carry out cooking cycles of sufficient complexity so that the optimum time/temperature profile can be established for each of the products that it may be desired to prepare.

In addition, there are occasions when it would be desirable for an operator to be able to make certain alterations in a particular cooking cycle without it being necessary to reprogram the controller. Prior art systems currently on the market do not provide this capability.

Also, conventional systems generally do not provide adequate protection in the case of a sudden power loss. When this happens, essential data relating to the cooking cycle being followed can be lost, resulting in the food in the cooker being ruined and made unfit for sale.

Furthermore, many existing systems do not have adequate safeguards to protect against improper operation of the cooker which can not only cause the food to be ruined, but can also result in damage to the cooker or injury to the operator. This is especially important when cooking under pressure where adequate safeguards must be provided to ensure that the pressure is fully released from the cooker before the lid is opened.

Finally, there is a need for a system which has an expanded capability in performing or assisting in the performance of many of the operations that are now performed substantially manually. For example, it would be desirable for such a system to be able to monitor itself and notify the operator when there is a malfunction, to tell the operator when he is doing something improperly, to advise the operator when the cooking oil needs to be changed, and the like.

DISCLOSURE OF THE INVENTION

In accordance with the present invention, a deep-fryer cooker together with a method and apparatus for controlling such a cooker is provided which has all of the capabilities described above as well as a number of other important features which, together, provide a more versatile, reliable, and easy-to-use cooking system.

According to one aspect of the invention, a plurality of complex cooking cycles can be programmed into the system, and each cooking cycle can be designed to have a plurality of time and temperature setpoints which together define a unique temperature profile for each cycle. Means are also provided, in the form of an alternate set point which is given priority over all other set points, to permit the operator to easily change the time or ending temperature of any particular cooking cycle without reprogramming the overall cooking cycle. This feature is especially useful in that it permits last-minute changes to be made in a cooking cycle by a relatively unskilled operator.

In accordance with a further aspect of the invention, means are provided to protect against a sudden loss of power. Specifically, when a power failure occurs in the middle of a cooking cycle, essential data relating to the interrupted cooking cycle is automatically transferred to a RAM which is powered by a capacitor to protect the data during the time of the power loss. If the power is restored in an allowable period of time, and if the oil temperature in the cookpot does not drop by more than a prescribed amount, the cooking cycle will be automatically reinitiated at the point where it was interrupted. If power is not resumed in the allowable period of time or if the oil temperature has dropped by more than an acceptable amount, the system will prevent the interrupted cooking cycle from being reinitiated and, in this way protect against the possibility of improperly prepared food being sold and consumed.

The invention also provides an improved heat regulation capability. Specifically, the heating elements to heat the cooking oil have been divided into two groups, each of which can be independently controlled to reach and maintain desired cooking temperatures more efficiently and accurately. In this connection also, means are provided to bring the cooking oil to the correct starting temperature for the particular cooking cycle selected and to maintain it at that temperature even if the operator is slow in loading the chicken or other food product into the cookpot.

A number of other capabilities have been built into the system to protect the quality of the food being prepared, as well as to protect against possible damage to the machine or injury to the operator in case of machine malfunction or operator error. For example, means are provided to prevent overcooking of the food and to indicate when the cooking oil needs to be changed.

Also, when cooking under pressure, the controller includes means for ensuring that the cookpot cannot be opened until the pressure has been properly vented from the system.

Means are also provided to prevent cooking programs from being entered improperly. Specifically, both visual and audible tones are given during programming to advise the programmer that a valid or non-valid entry was made. Also, cooking with an improperly programmed cook cycle will be automatically rejected.

Finally, the system includes a variety of built-in diagnostic capabilities to ensure that everything is working properly and to notify the operator when there is a malfunction.

The above and other important features and advantages of the invention will become apparent hereinafter in connection with the following detailed description of the presently preferred embodiment taken in conjunction with the drawings.

BRIEF DESCRIPTION OF THE DRAWINGS

FIGS. 5-8 comprise detailed circuit diagrams of the controller of FIG. 4 according to a presently preferred embodiment of the invention wherein:

FIG. 5 illustrates the circuitry associated with the memory components of the controller;

BEST MODE FOR CARRYING OUT THE INVENTION

Figure 1:
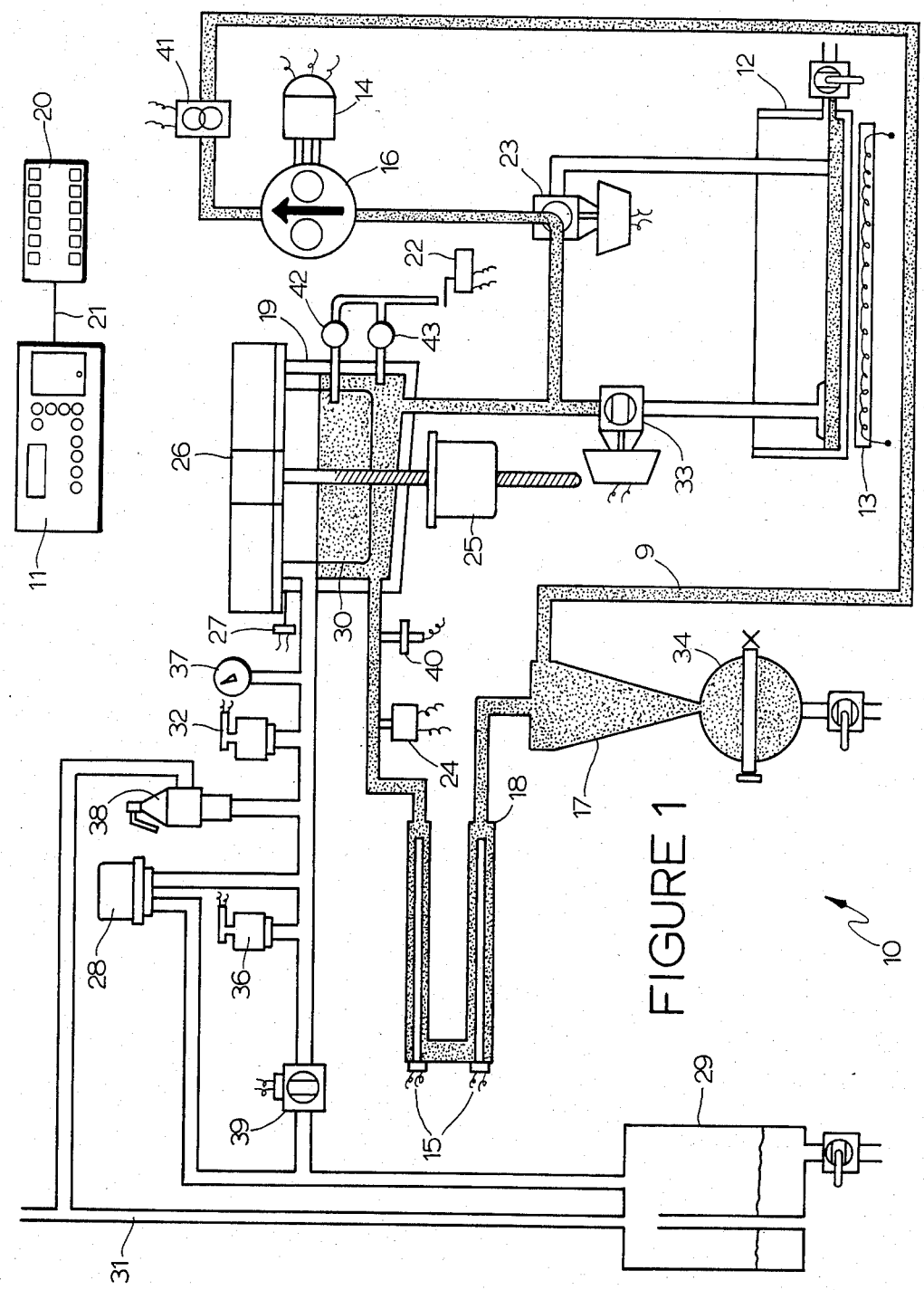
FIG. 1 schematically illustrates a deep-fryer cooker system according to a presently preferred embodiment of the invention.

FIG. 1 schematically illustrates a deep-fryer cooker system according to a presently preferred embodiment of the invention. The system is generally designated by reference numeral 10 and is capable of cooking up to 50 pounds of chicken or other food in a highly automated manner. Essentially all of the structure schematically illustrated in FIG. 1 will actually be enclosed within or supported on a cooker cabinet or console with the exception of the controller 11 which is preferably supported at an appropriate location that is adjacent to the console and convenient to an operator.

It is believed that the system illustrated in FIG. 1 can best be described by going through the sequence of steps that the system would perform in a typical cooking operation. Initially, the cooking oil, which is illustrated by the darkened portions of the fluid circulating system of FIG. 1 and is identified by reference numeral 9, is adapted to be stored in a filter tank 12 where it is preferably kept in a fluid state by a small heating element 13 positioned below the tank. When it is desired to initiate a cooking operation, a cook cycle selection is made on the controller 11 by the operator (as will be explained more fully hereinafter); and a motor 14 is actuated to drive a pump 16 to begin pumping oil from the reservoir 12 through a vortex filter 17 and through a series of heat exchangers 18 to cookpot 19. A catch pot 34 is provided for catching bread crumbs filtered by the vortex filter 17. The heat exchangers are provided with appropriate heating elements 15 to heat the cooking oil as will also be described in greater detail hereinafter.

The controller 11 interfaces with the cooker system via a relay board 20 which is mounted on the cooker console. The relay board contains a number of relays which are driven by the controller to control the various heaters, valves, and motors in the cooker system; and a multiconductor cable 21 connects the remote controller to the relay board.

A pair of overflow valves is provided to control the oil level in the cookpot: a low-level overflow valve 43 and a high-level overflow valve 42. If a first oil level is desired, valve 43 is closed and valve 42 is opened such that when the oil level reaches the level of valve 42, overflow switch 22 will be actuated to operate selector valve 23 to prevent the pumping of further oil into the cookpot. If a higher oil level is desired, both valves 42 and 43 can be closed; and all of the oil in reservoir 12 will be pumped into cookpot 19. Although not illustrated in FIG. 1 since it does not form a part of the present invention, the system also includes appropriate means for preventing the level of oil in the cookpot from rising too high.

When the desired level of oil is in the cookpot, valve 23 is rotated to the cookpot position allowing oil to flow in a closed loop in which the filter tank 12 is no longer used. After valve 23 has rotated to the cookpot position, heat exchangers 18 are actuated if oil flow is sensed (by fluid flow sensor switch 41), if the pump is on, and if over-temperature sensor 24 is closed. The temperature of the cooking oil is increased until the desired cooking cycle starting temperature is reached. When the correct temperature is detected by temperature sensor 40, an appropriate visual and audible signal is given to notify the operator that the cooker is ready to be loaded. Specifically, at the end of the warm-up cycle, in order to protect against cold starts, software in the controller determines if the oil temperature has been maintained at approximately the starting temperature for 16 seconds. If this test is validated, the operator will be advised by a visual display and a pulsating tone that the chicken may be loaded into the cookpot. The chicken or other food is then loaded into appropriate trays by the operator and inserted onto a large rack shown schematically at 30 and attached to the lid 26 of the cookpot 19. The operator then actuates the lid motor 25 and the lid is lowered into the cookpot carrying the chicken with it. If the operator is slow in loading the food, the controller will continue to maintain the cooker at the beginning cooking temperature as long as is necessary.

When the lid is properly seated, a low-limit switch 27 is switched indicating that the cooking cycle may begin. The cook clock for the selected cooking program will automatically start when the lid is properly closed. The food is then carried through the selected one of the several cooking cycles that have been previously programmed into the controller until the cycle is completed.

Near the end of the cooking cycle, preferably with about one minute remaining, pressure is automatically vented from the cookpot 19 by operating valve 39 which allows steam to be vented to the atmosphere via a blowdown tank 29 and exhaust line 31. The system illustrated in FIG. 1 can be used both for conventional cooking or pressurized cooking; and if non-pressurized cooking is used, valve 39 will remain open during the entire cooking process.

When the pressure in the cookpot has been relieved sufficiently (e.g., to no more than $0.0689 \times 10^6$ Dynes/cm$^2$), lid pressure switch 32 will be actuated to cause the lid to raise automatically and cause actuation of an appropriate light and/or pulsating tone to notify the operator to remove the now fully cooked chicken. For added protection, the controller will prevent the opening of the cookpot until 15 seconds after the cooking cycle has ended.

At the end of the cooking cycle, the system is designed to automatically go to a standby mode in which the cooking oil will be drained from the cookpot 19 through drain valve 33 into filter tank 12 where heating element 13 will keep the oil in a fluid state. In this mode also, all valves are automatically reset and all motors are shut off.

The cookpot drain circuit is controlled by two relays: one opening and one closing the valve 33. The drain opening relay, in particular, is in series with a $0.310 \times 10^6$ Dynes/cm$^2$ pressure switch 36 that will not allow the drain to open until a pressure of no more than $0.310 \times 10^6$ Dynes/cm$^2$ is detected in the cookpot.

The controller software also contains a feature to cause the valve 33 to wait 30 seconds before opening when ending a pressurized cooking cycle for even further assurance that the pressure has dropped to a safe level. A pressure gauge is also included within the system as indicated at 37 to monitor the pressure within the system.

Figure 10:
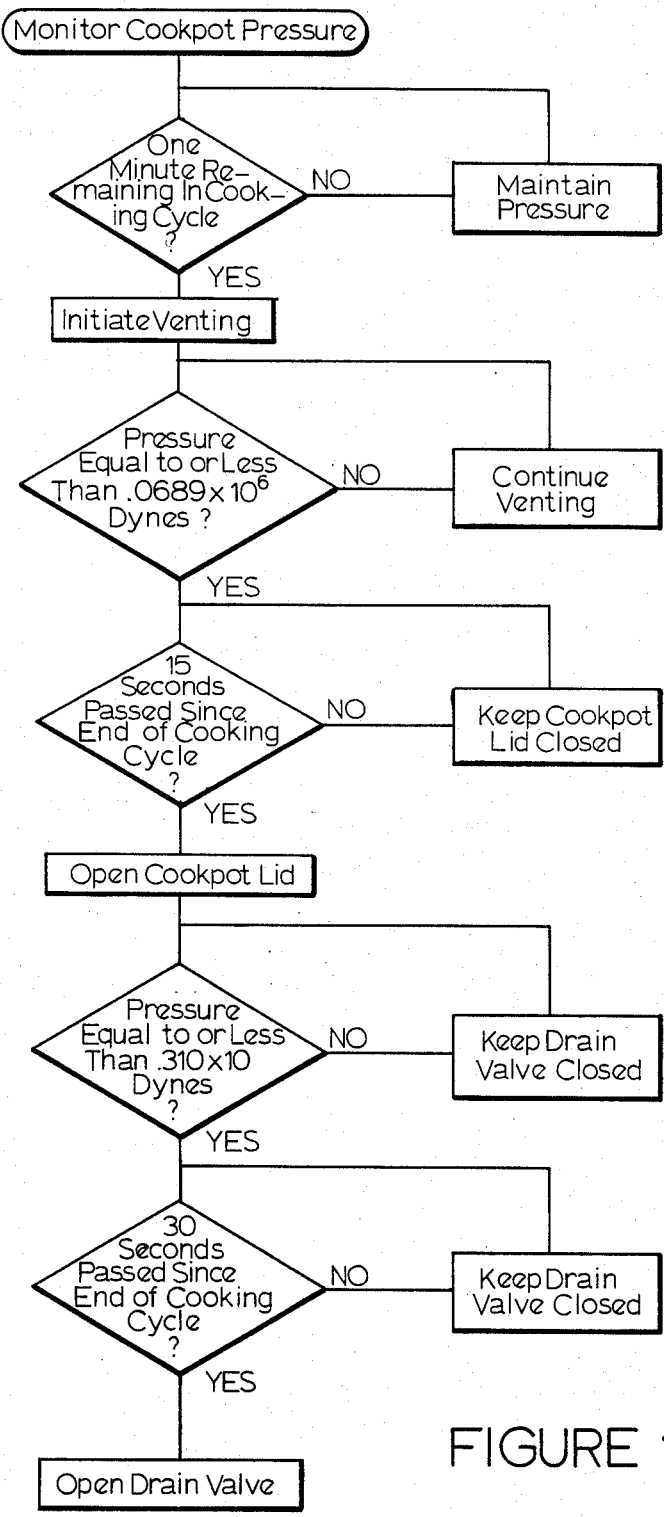
FIG. 10 is a flow chart illustrating the sequence of steps performed by the controller in ensuring that all pressure is released from the cookpot when cooking under pressurized conditions.

FIG. 10 is a flow chart which is provided to illustrate the above-described sequence of steps that are carried out by the controller to ensure that the cookpot will not inadvertently open while still pressurized and that greatly reduce the likelihood of injury to the operator or others in the vicinity of the cooker as a result of malfunction.

If a power failure occurs while the cooker is in operation, means are provided to protect essential data relating to the cooking cycle in progress so that if power is restored within an acceptable period of time and before the temperature of the cooking oil drops by more than a predetermined number of degrees, the cooking cycle can be resumed at the point where the power failure occurred. This important feature will be described in greater detail hereinafter.

The cooker also includes a safety relief valve 38, an automatic blowdown valve 28, and a number of other features which will not be described herein as they are not pertinent to the present invention.

Figure 2:
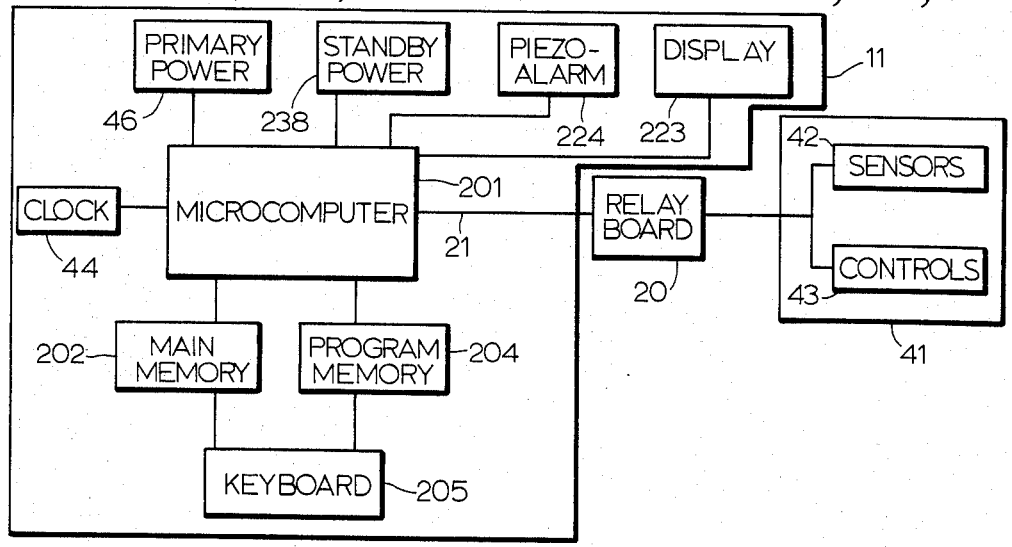
FIG. 2 comprises a block diagram illustrating the major components of the controller of FIG. 1.

FIG. 2 illustrates, in block diagram form, the basic components of the controller 11 of the present invention. A more detailed block diagram is provided in FIG. 4 while specific circuit diagrams of the presently preferred embodiment of the controller are shown in FIGS. 5–8.

The heart of the controller 11 is a microcomputer 201 which is designed to control the operation of the cooker, monitor its condition, communicate with the operator and the like. It preferably comprises an eight-bit, low-power CMOS microcomputer with a 128×8 RAM and 27 I/O lines. The software to control all of the basic cooking algorithms is contained in an external 8k×8 EPROM main memory data storage means 202, while the programs defining the various cooking cycles to be carried out by the controller are stored in an external, 2k×8, electrically erasable PROM 204. Data is entered into the memories via a keyboard 205 preferably positioned on the controller housing.

Controller 11, as indicated previously, is preferably positioned at a location convenient to, but spaced from, the cooker console 41 and is coupled thereto by cable 21 connected to relay board 20 mounted on the console 41.

Microcomputer 201 monitors the condition of the various sensors in the cooker (generally designated as sensors 42 in FIG. 2), including temperature sensors 24 and 40, pressure sensors 32 and 36, and fluid flow sensor 41 in FIG. 1 and, under instructions from memories 202 and 204, controls the overall operation of the cooker by actuating the various motors and switches via the relay board to operate the pump 16, cooker lid 26, heaters 15, and the various valves illustrated in FIG. 1. These controls are generally designated by reference numeral 43 in FIG. 2. A clock crystal 44 is connected to the microcomputer to provide sequencing signals to permit the microcomputer to be operated by the control programs stored in memory 202.

The microcomputer 201 communicates with the operator by means of a four-digit display 223 and piezoalarm 224 which are used to advise the operator of the status of the cooker, to notify the operator when various operations are to be performed (e.g., loading and unloading of the chicken), and to warn the operator of a problem, and the like.

The system is designed to be powered by either 208 VAC or 240 VAC, one-phase, input voltages (designated as primary power source 46), depending on the cooker power requirements. In case of a power failure, a standby power source 238 is provided which is capable of furnishing power to protect essential data relating to an interrupted cooking cycle for a limited period of time so that the cooking cycle may be resumed at the point of the interruption if power is quickly restored as will be discussed more fully hereinafter.

Figure 3:
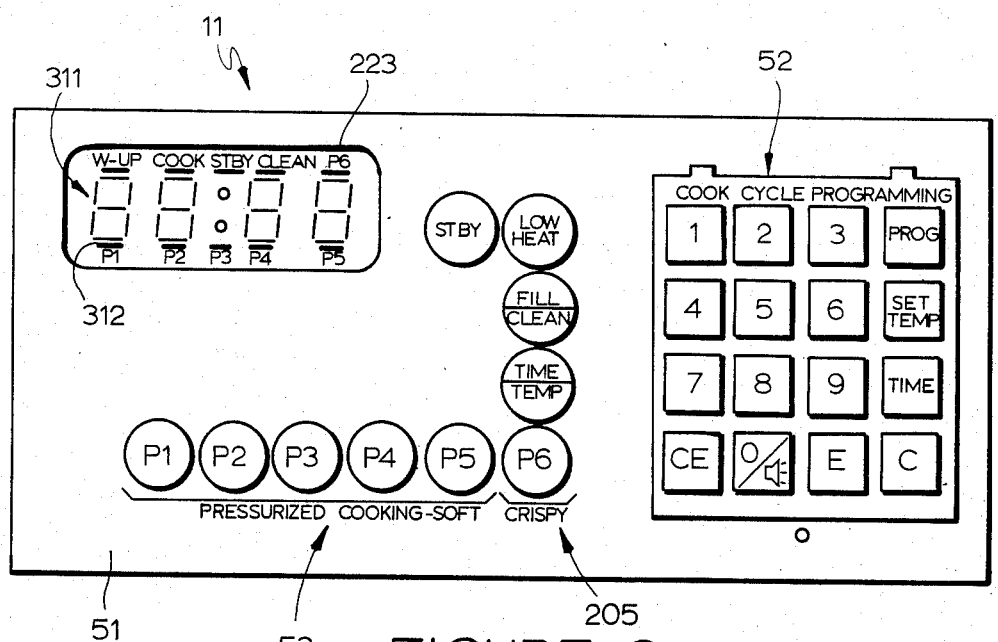
FIG. 3 illustrates the front face of the controller housing to show the keyboard and digital display thereon.

FIG. 3 illustrates the front panel 51 of the housing of the controller 11. As can be seen, this panel contains the keyboard 205 as well as the four-digit display 223.

As shown, the controller has 16 programming keys 52 and 10 keys 53 for WARMUP, STANDBY, CLEANING, TIME/TEMP display, and cooking cycle selection. The programming keys are preferably located behind a cover lid (not shown) because they are not necessary for basic cooker operation once the cooking cycles have been entered in memory. If desired, the programming keys can also be located on a remote, hand-held switch that could be plugged into the controller. The STBY key will stop all cooker operations and turn off heaters 15, open the vent valve 39 (FIG. 1), and reset all valves to their original position. When STBY is depressed, the cooker enters the NO COOK mode and displays the cookpot temperature on display 223 until further instructions are received. Keys P1, P2, P3, P4, and P5 are dedicated to pressurized (lid closed, vent closed) cooking.

The operator wanting to cook with program ONE cycle will press the P1 key. This will start the warm-up cycle for program ONE, and display 223 will eventually display 'drop' (See FIG. 15G) when the oil level in the cook pot reaches the desired level and the starting temperature (the temperature of the first programmed setpoint of the cooking cycle) is reached and stabilized. The controller will maintain the temperature of the vat at set point one temperature indefinitely, or until the food is loaded into the cooker and the lid lowered to start the cook clock and execute the preprogrammed cooking cycle. During the cooking cycle, the vat temperature and cooking time remaining can be displayed by depressing the TIME/TEMP key. If time is displayed, depressing the TIME/TEMP key will cause temperature to be displayed and vice versa.

The P6 key controls the warm-up and cook for non-pressurized cooking. The vent will remain open if program SIX is selected. Program SIX warm-up and cook are identical in function to the first five program keys; but toward the end of this cooking cycle, the heaters will remain ON, if heat is required, for the duration of the cooking cycle.

The programming keys 52 are used to enter setpoint times and temperatures for any of the six programs. Each cooking cycle program can, according to the presently preferred embodiment, have up to eight setpoints, each of which can be used to define a unique temperature profile for the cycle. To alter or begin a new program, a three-digit access code must be entered to alter setpoints 1–7; and a separate three-digit access code must be entered to alter the eighth or alternate setpoint. Since the eighth setpoint has been given priority over the first seven (as will be discussed hereinafter), it has been assigned its own access code.

The C (CLEAR) key, if used during programming, will not clear the COOK mode. The TIME key will allow time to be viewed during cooking or during programming. The SET TEMP key allows the set temperature in memory to be displayed and also is used when programming a new set temperature.

The "0" key has a dual role; it enters the zero and also stops the audible piezo alarm if the sound gets annoying. The CE key is used to clear the last programmed entry, if the ENTER key had not yet been depressed; and when programming the setpoints, CE will cause the setpoint number to be displayed.

The PROG key is used to enter the Code mode, or to enter the program number of the cooking cycle to be entered. Depressing the PROG key twice causes 'CodE' to be displayed (see FIG. 15F), and the three-digit access code can be entered at that time.

The three-digit access codes are determined by fixed, three-digit codes written in software. Non-valid entry of a code will cause the controller to ignore all subsequent code entries until the PROG button is depressed two more times and valid entry is made. Only validated digit entry is indicated by an audible tone.

Figure 11:
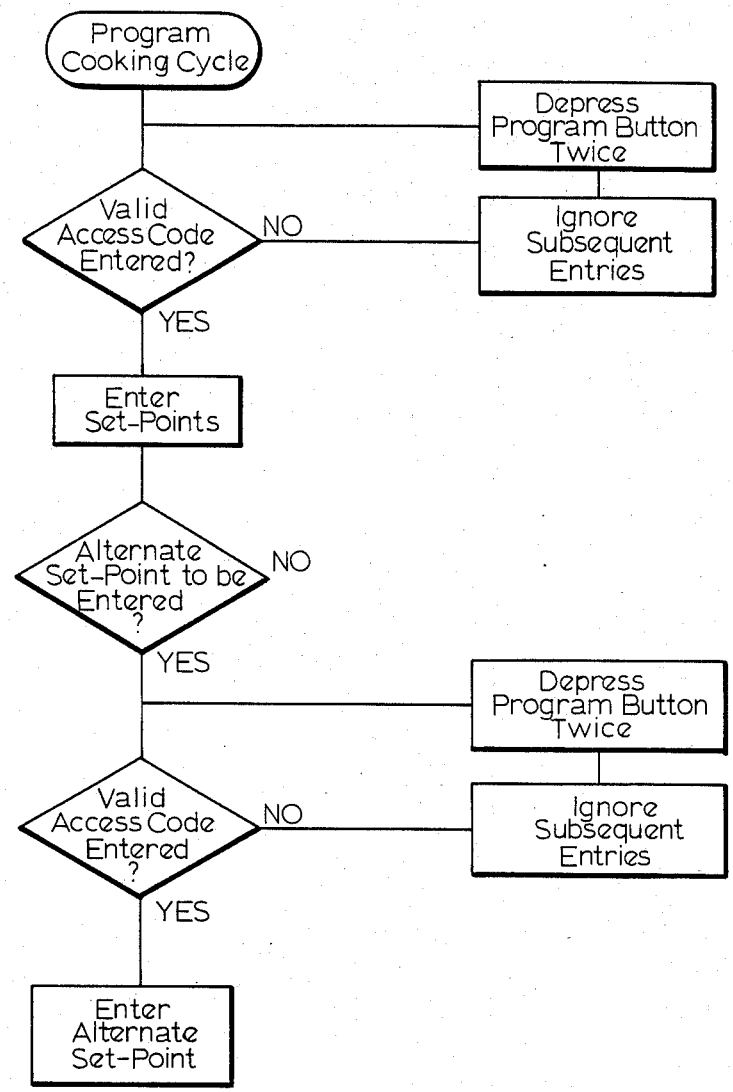
FIGURE 11 is a flow chart illustrating the sequence of steps to be performed to enter a cooking cycle into the controller memory.

FIG. 11 is a flow chart illustrating the sequence of steps that must be performed to enter a cooking cycle into memory 204 and to enter an alternate set point to change the cooking cycle.

Figure 4:
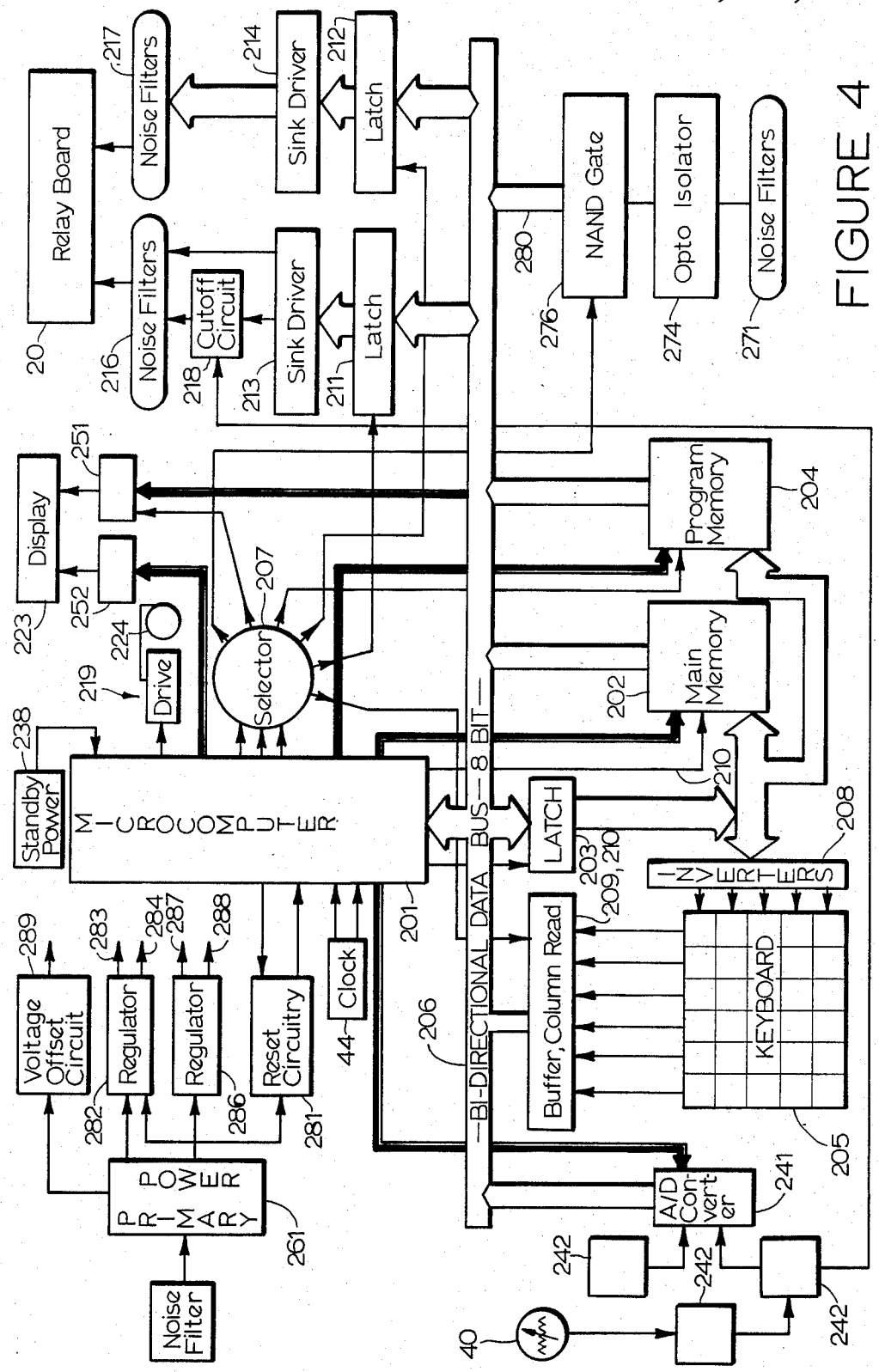
FIG. 4 comprises a detailed block diagram illustrating the components of the controller of FIG. 1.

The controller itself will now be described in detail with reference to FIGS. 4–8. FIG. 4, in particular, comprises a detailed block diagram of the controller system while FIGS. 5–8 comprise detailed circuit diagrams of various portions of the system according to the presently most preferred embodiment of the invention.

As indicated previously, the heart of the controller 11 is an eight-bit, low-power CMOS microcomputer 201 with a 128×8 RAM and 27 I/O lines, while the software to control all of the basic cooking algorithms is contained in an external 8K×8 EPROM memory 202. Memory 202 is addressed by sending address data latched by integrated circuit 203 and held until an enable PSEN signal from microcomputer 201 is sent on line 210 requesting a new program instruction code.

Programs that are entered by the keyboard 205 are stored in a 2K×8 electrically erasable PROM 204. Data to be entere-d into memory 204 is sent out on the data bus 206, and the address location where it is to be stored is held in latch 203. The $V_{pp}$ (21 VDC programming voltage) is applied to memory 204 pin 1 (FIG. 5) where internal circuitry generates the programming pulse necessary to enter the new data byte. Data to be read from memory 204 is put on the bus when the OE and CE lines both go low. Data can be written into memory 204 when WE and CE are both low. Line decoder 207 sends out the CE chip enable pulse (line S4 on FIG. 5) needed to enable 204. A RDY/BUSY line on memory 204 (pin 2 FIG. 5) signals the processor when data storage has been completed and a new operation can be started.

Open collector inverter gate 208 (also see FIG. 5) is used to buffer the processor from the keyboard and to derive proper logic levels for keyboard switch detection. Open collector NAND gates 209, 210 are enabled by the S1 line from decoder 207 (FIG. 5), and the RD line from memory 204 and their outputs used to determine which column has had a key depression. The row scan is accomplished by sending a high-level TTL signal on any of the gate inputs of 208. Keyboard debouncing, valid key entry, and double-key depression are monitored and provided in software internal to ROM memory 202.

Figure 7A:
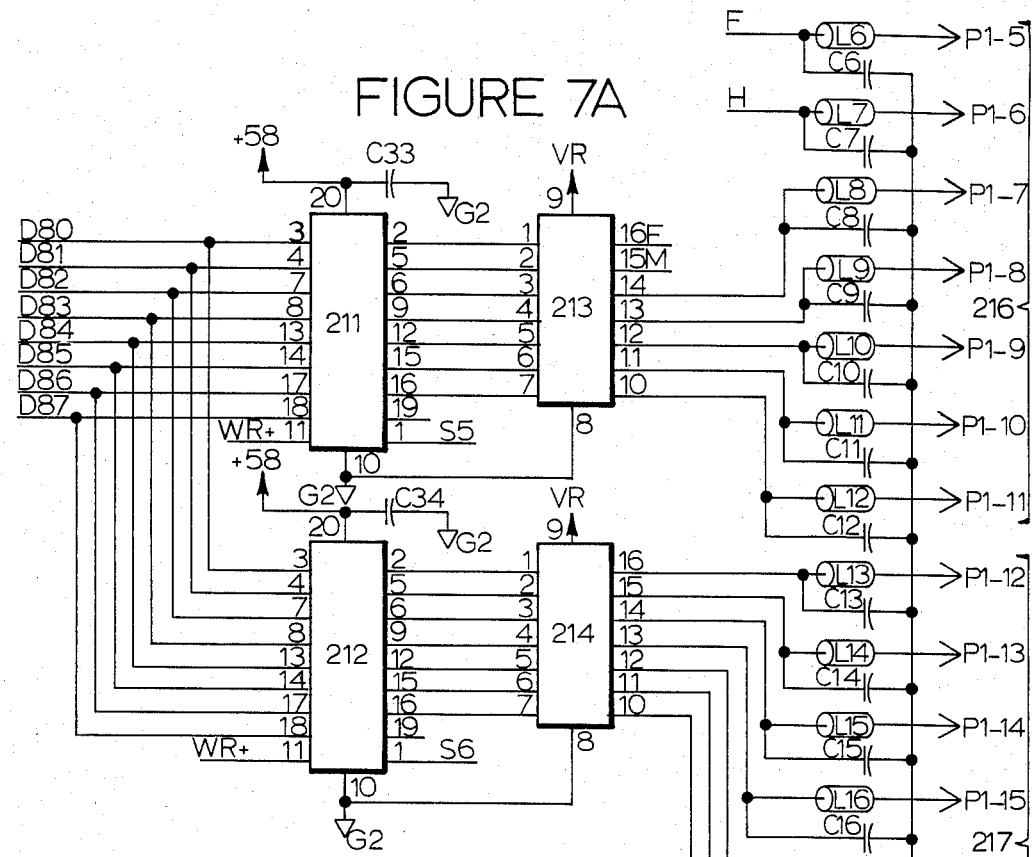
FIG. 7A illustrates the circuitry associated with the relay output drive.

The output drive circuitry consists of four integrated circuits, two eight-bit latches, and two sink drivers. The latches 211 and 212 (FIGS. 4 and 7) accept eight-bits of data each from the data bus of microcomputer 201 (lines DB0-DB7) and latch this information until the next latch occurs. A WR generated from microcomputer 201 and an active low (lines S5 and S6 from decoder 207) are used to enable and trigger the latches. This latched information [active ('ON') high] is applied to the inputs of the sink drivers 213 and 214 (FIG. 7A). A high-level TTL signal on any input of 213 and 214 causes the corresponding output line of either component to go to circuit ground, thus completing the circuit to an external relay on relay board 20 of which there are twelve. All output lines to the relays are filtered for noise by noise filters 216 and 217 comprising a capacitor-inductor network consisting of a ferrite bead and a 1000 pf capacitor. This is provided to limit high-frequency noise that is generated external to the board from entering the controller printed circuit board at the P1 connectors.

The first two sink lines of 213 are sent through a circuit 218 including switching transistors 221 and 222 (FIG. 8B) which turn off power to the heaters if a temperture sensor failure is detected. Temperature-sensing circuitry will activate the heater cutoff if a temperature of −17.77° C. or below is sensed, or if the probe is completely shorted. An open probe will cause the sensor circuitry to input a voltage to saturate the analog to digital converter 241 and tell the processor that maximum heat is reached. This will prevent the heaters from being on continuously in the event of the sensor line being opened.

The piezo annunciator 219 (FIG. 5) is controlled by port 16 from microcomputer 201. When this port goes low, the output of pin 12 of inverter 208 is high which turns on transistor 253 and provides a ground leg to the piezo alarm 224. The piezo alarm has a built-in oscillator circuit to establish its base frequency, but computer 201 modulates the piezo alarm to get several different sounding audible cues.

Figure 7B:
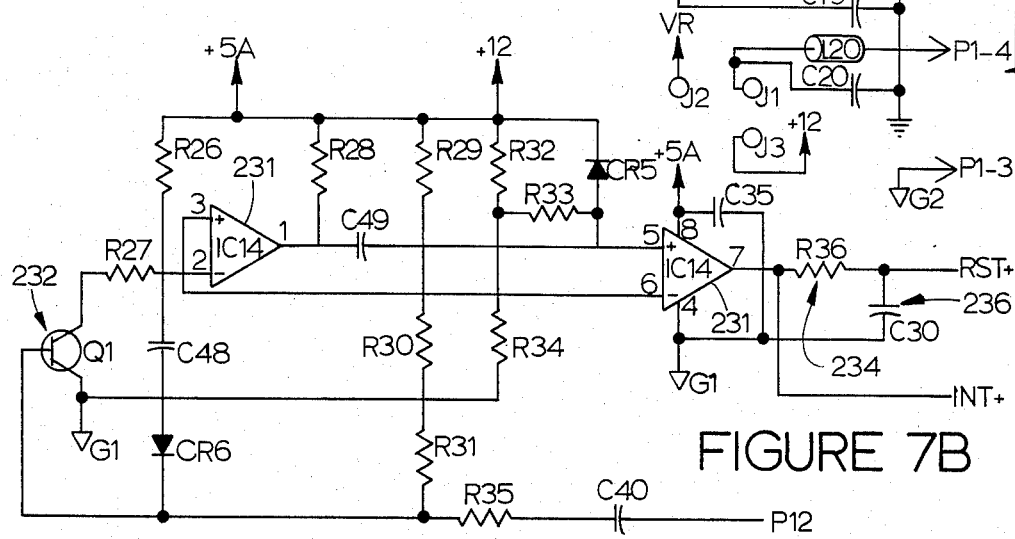
FIG. 7B illustrates the reset circuitry.

Protection against the possibility of a power loss is provided by the system of the present invention and is handled by the circuit illustrated in detail in FIG. 7B consisting of an operational amplifier 231 and an NPN transistor 232 and their associated components. The input power to the +5 VDC regulator IC 233 (FIG. 8A) is constantly monitored and, when it begins to drop below 8 VDC, causes IC 231 pin 7 to go low, thus interrupting the microcomputer 201. The interrupt (INT) must occur before the reset (RESET) so resistor 234 and capacitor 236 are used to delay RESET. The interrupt signals the computer 201 to begin storing away essential data relating to the cooking cycle in its internal RAM memory or other volatile data storage means such as the present mode (COOK, STANDBY, WARM-UP) and the time remaining on the clock and vat temperature at the time of the power failure. Transistor 237 (FIG. 5) monitors the voltage of $+V_{12}$ and isolates all other devices from the $V_{DD}$ (low power standby pin) input of microcomputer 201 when $+V_{12}$ is removed.

The standby capacitor 238 (FIG. 5) is sufficient to provide power to the RAM memory of microcomputer 201 for two minutes; and if the power is restored within that period, the cooking cycle will be resumed where it left off. If power is not restored, however, the RAM memory contents will be lost; and the controller will go to the NO COOK mode when power is restored.

The two-minute storage capacity of the capacitor has been found to be adequate because after a longer period of time, the temperature of the cooking oil will have dropped to such an extent that cooking cannot properly be resumed in any event without the likelihood that the food will be improperly prepared. For the same reason, if the oil temperature in the cookpot drops by more than a preset number of degrees (e.g., 5.56° C.) during the power failure, the cooking cycle will not resume even if power is restored within the two-minute period. This further protects against the possibility of improper food preparation as a result of the interrupted cooking cycle.

It should be recognized that the cooking cycle programs themselves will not be lost if the two-minute period is exceeded since they are permanently stored in non-volatile memory 204. Only data relating to the interrupted cooking cycle will be lost.

Figure 12:
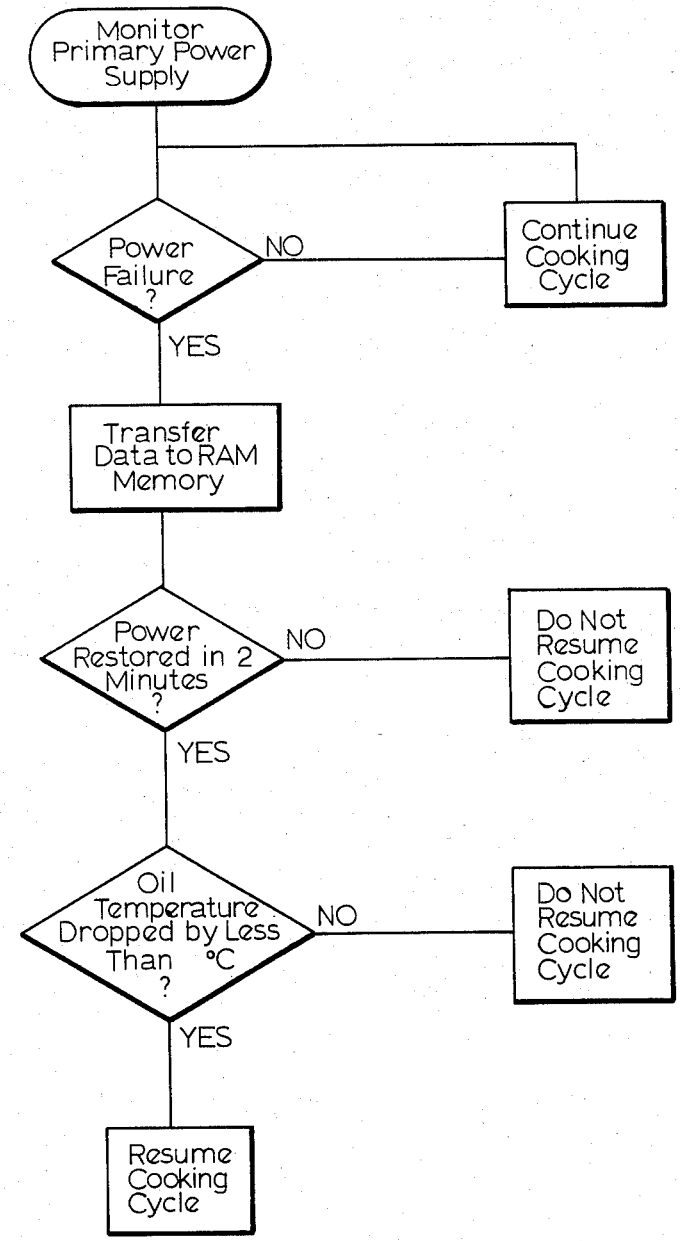
FIG. 12 is a flow chart illustrating the sequence of steps performed by the controller in case of a power failure to protect data relating to a cooking cycle in progress.

FIG. 12 comprises a flow diagram illustrating the sequence of steps performed by the controller in case of a power failure to ensure that the cooking cycle will be resumed only if the conditions within the cookpot are suitable.

The microcomputer 201 can also be interrupted and reset by circuitry 281 if it fails to generate a continuous "watch-dog" sync pulse on its port 12. This condition might occur if the processor lost its place in memory and went to a locked state where program execution halted. Transistor 232 (FIG. 7B) is used to detect the regular signal from the port 12 and keep the output of comparator 231, pin 7 at a high TTL level so that no reset or interrupt occurs during normal operation.

Device selection for enabling the keyboard read, display latch, relay output latch, and user memory is accomplished by chip select outputs of selector 207. This is a three-to-eight decoder integrated circuit that accepts a three-bit address from microcomputer 201 and pulls the corresponding output low. The RESET line is tied to the G1 input of selector 207 so if reset goes low, the outputs of selector 207 will all go high; and no device selection will occur during RESET.

Figures 8A, 8B:
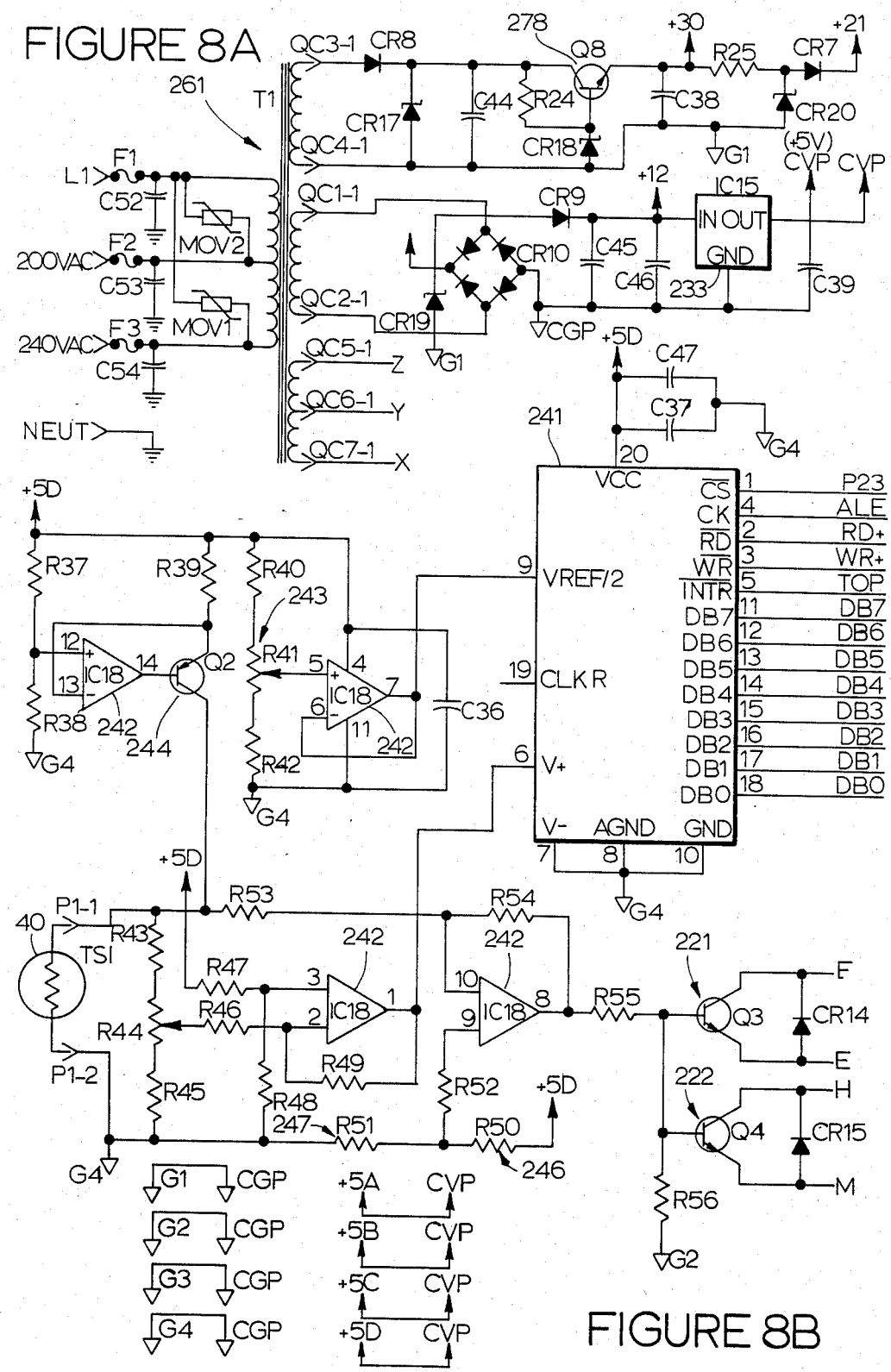
FIG. 8A illustrates the circuitry associated with the power supplies.
FIG. 8B illustrates the temperature-sensing and fail-safe circuitry.

The temeprature-monitoring circuitry is illustrated in detail in FIG. 8B and consists of a CMOS analog to digital converter 241, a voltage reference, constant current source, and failure-detection circuitry built around quad operational amplifier 242. The A/D converter is instructed to start a conversion when lines CS and WR are simultaneously low. When data is ready to be read from the A/D, the INTR line of A/D 241 will go low. The CS and RD lines should be pulled low to allow new data to be sent on the data bus to 201. The A/D converter uses a clock generated by the ALE line of microcomputer 201 for synchronization during conversions.

The voltage reference from amplifier 242 pin 7 is used to set the maximum input range of the A/D converter. For a total input voltage swing of 3.5 VDC, the $V_{REF}/2$ input of A/D 241 should have 3.5/2 or +1.75 VDC applied. Potentiometer 243 fine adjusts the REF output of amplifier 242, pin 7 and allows temperature readings to be adjusted up or down for calibration purposes. Pin 1 of 242 is the operational amplifier output that controls the analog input to A/D 241. This fourth of the op-amp is responsible for correcting the sensor offset and gain so zero volts will appear on 242 pin 1 when the temperature sensor 40 is at 67.7° C. or below, and 3.5 volts will appear on pin 1 when at a temperature of 206.7° C. or above. Readings below 68.33° C. will show 'Lo F' on the display 223 (see FIG. 15J) indicating that the temperature has dropped below the range of reading. This presents no problem to the operator since warming or melting of new oil is done at a higher temperature than 68.33° C.

Transistor 244 and one fourth of amplifier 242 are used to provide a constant current to the temperature probe so that voltage output will be approximately linear with temperature.

Voltage divider 246 (FIG. 8B) in series with resistor 247 is used to establish a set reference voltage that is compared against the probe output voltage $V^{(P1-1)}$ at all times. The comparison is made on input pins 9 and 10 of comparator 242. If the voltage on 242 pin 10 falls below the voltage on 242 pin 9, the output of 242 pin 8 will approach zero volts and turn transistors 221, 222, and 223 off. Heater relays will be de-energized when this happens. When the voltage on pin 10 is greater than that of pin 9, the output 242 pin 8 will approach +3.5 VDC and turn transistors 221, 222, and 223 ON. This does not necessarily turn the heaters on since they are in series with the heater relay inputs, and the relays must also be turned on with the sink driver array 213 (FIG. 7A).

The sensor used is a thin film RTD probe 40, but a platinum wire-wound probe can also be used if desired. Thin film was selected due to its low-cost, accuracy and its high resistance (1000 ohms at 0° C.). Because of its high resistance, the length of cable from the controller to the cooker has little, if any, effect on temperature readings. The RTD was selected because of its linearity for the range selected and because it is fail-safe (if the probe element breaks, the probe reading looks like a high temperature). The RTD resistance increases with increasing temperature so the A/D converter 241 will see an increasing voltage with increasing temperature.

The possibility of an over-temperature condition is also preferably monitored by a separate bi-metallic sensor or sensor disk mounted on the oil circulating pipe of the cooker (sensor 24 in FIG. 1). If the high-limit temperature is reached (e.g., 207.2° C.), the thermostat or sensor disk will turn off power to the heaters just as the controller should have done. This gives the operator a backup system in the event of a controller failure.

Thus, the system according to the present invention provides that the heaters will be shut off if the oil temperature is above a predetermined level, as well as was indicated previously, if the temperature-sensing probe is not properly operating. These provide a substantial degree of protection against the possibility or operator injury or damage to the machine.

Figure 13:
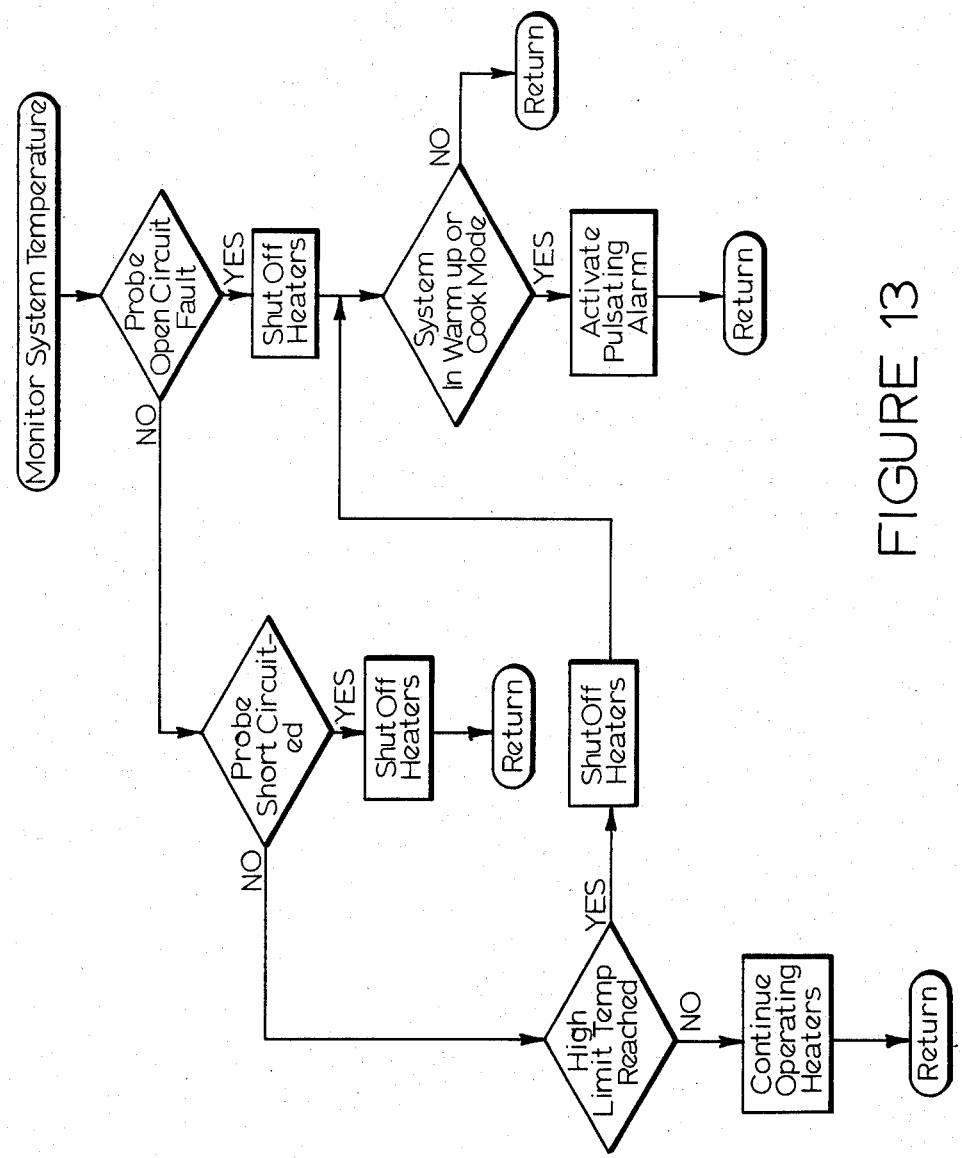
FIG. 13 is a flow chart illustrating the temperature-monitoring capability of the controller according to the present invention.

FIG. 13 illustrates, in flow diagram form, the operation of the controller in monitoring the temperature of the system.

Figure 5:
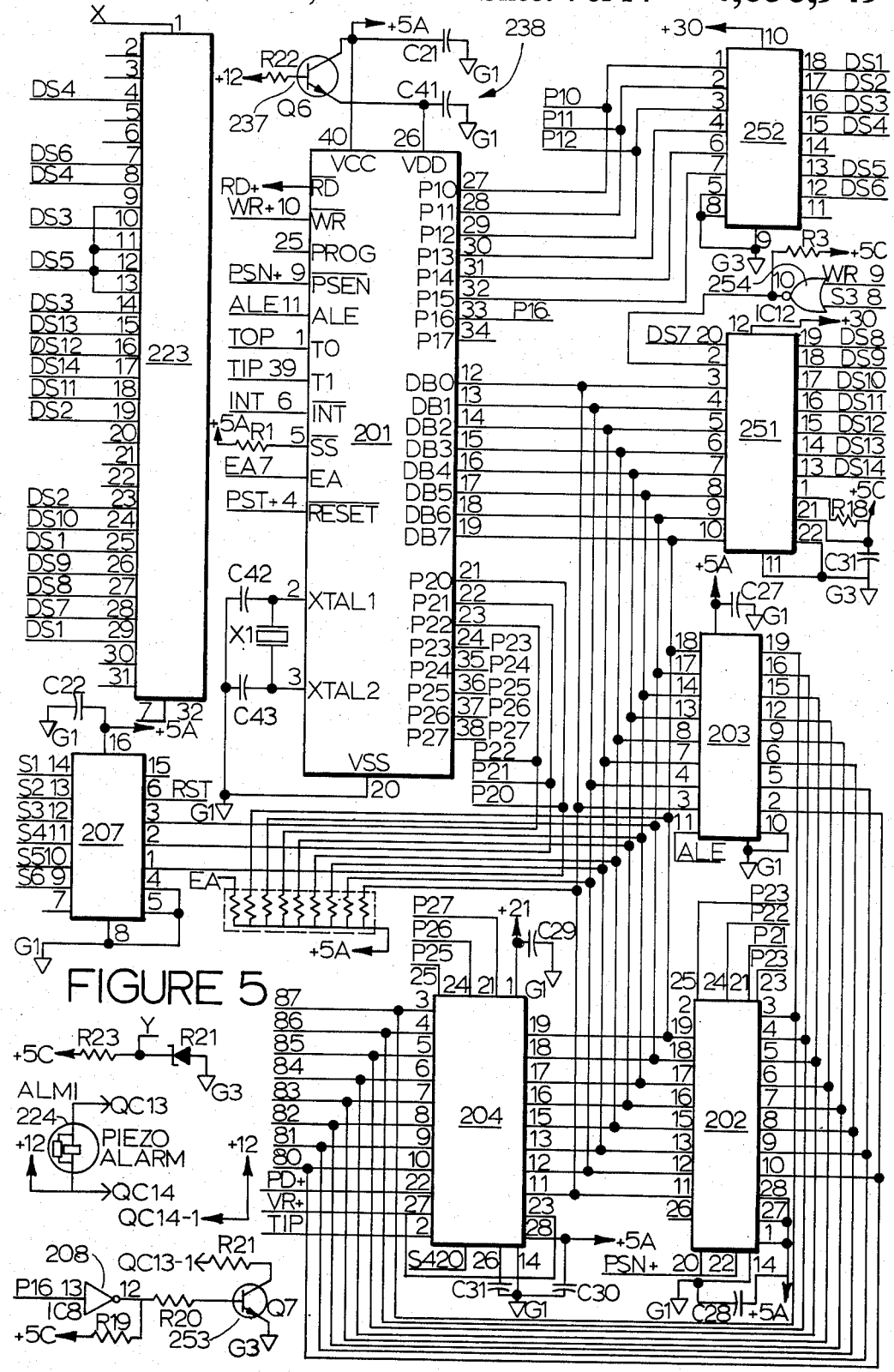
Figure 6A:
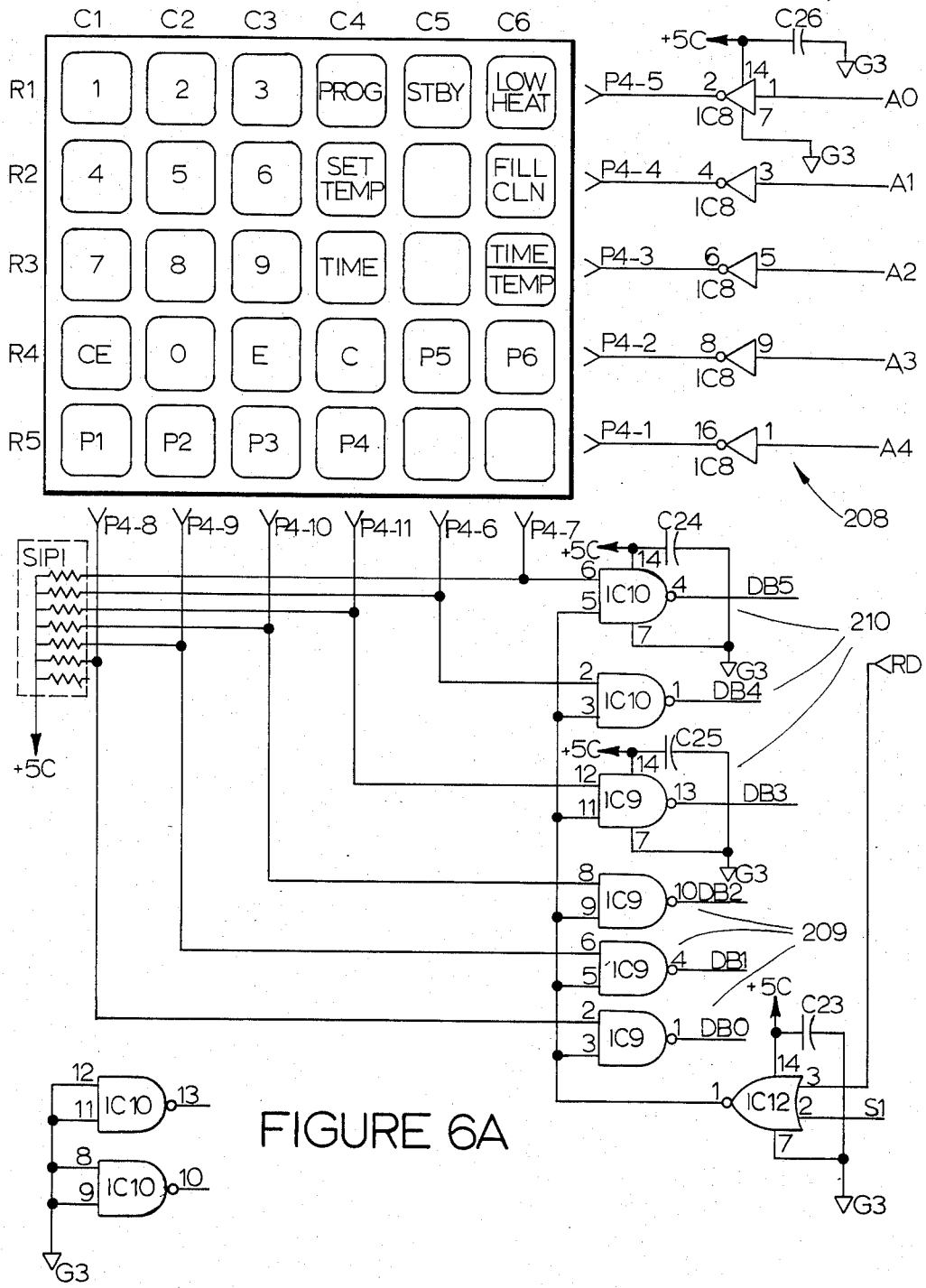
FIG. 6A illustrates the circuitry associated with the keyboard interface.
Figure 6B:
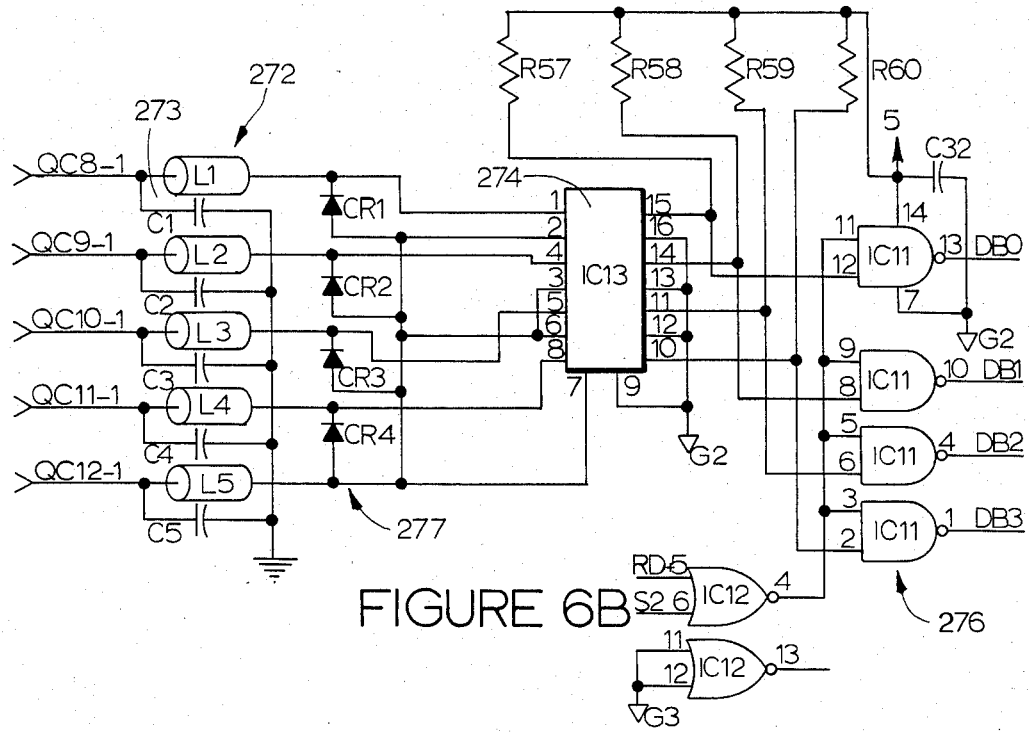
FIG. 6B illustrates the circuitry associated with the wait inputs of the controller.

The display drive circuitry is illustrated most completely in FIG. 5 and consists of latch/driver 251 and driver 252 controlling grid power to a four-digit vacuum, fluorescent display 223. The display (shown more clearly in FIG. 3) has the provision to indicate status by alphanumeric characters generated on its four digits 311 or by indicator bars 312 located above and below each grid location. Cooking program numbers, WARM-UP, COOK, STANDBY, and CLEAN are all indicated using the bar indicators as shown in FIG. 3. All other information is generated from the seven-segment digits. The segment information for each grid is multiplexed using source driver/latch 251 to hold the segment information while source driver 252 is used as the grid selector and upper or lower bar selector. The colon grid drive is performed on driver/latch 251. Segment information is sent out from microcomputer 201 on the data bus and is latched into 251 when NOR gate 254 is activated (high). Software in the controller selects the proper digit grid for the information to be placed.

The filament for the display is powered by a three VAC secondary 289 from the main transformer 261 (FIGS. 4 and 8A). The center tap of the transformer is held at a +3.9 VDC level to assure proper cutoff of the display segment voltage inside the display to eliminate ghosting effects.

Figure 15A:
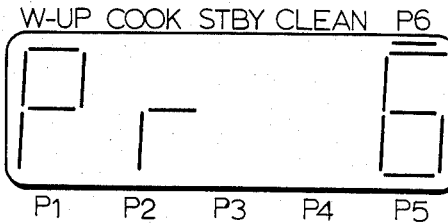
FIGS. 15A-15J illustrate some of the indications that can be generated on the system's digital display to advise the operator of the status of the system.
Figure 15B:
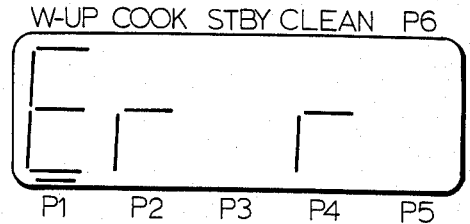
Figure 15C:
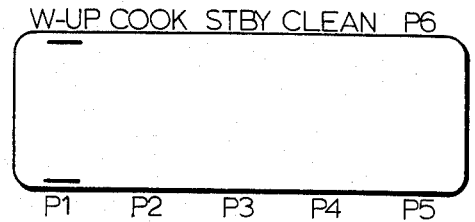
Figure 15D:
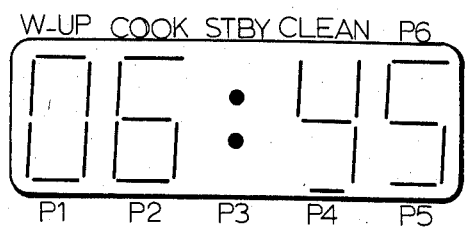
Figure 15E:
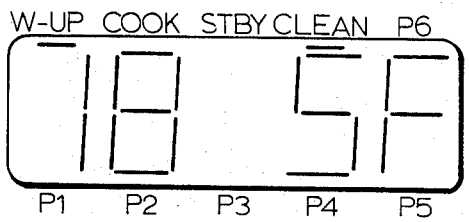
Figure 15F:
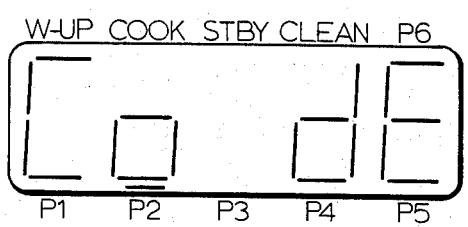
Figure 15G:
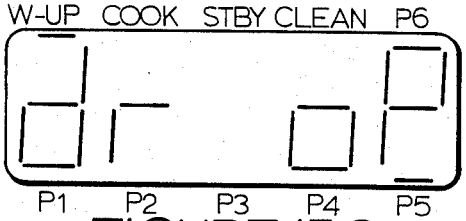
Figure 15H:
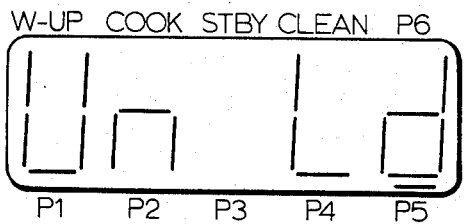

FIGS. 15A–15J are provided to illustrate some of the indications that can be generated on the display 223. FIG. 15A illustrates the display indicating an initial program selection of cooking cycle program SIX. FIG. 15B indicates an invalid entry or that no program exists. FIG. 15C indicates that the warm-up mode of program ONE is in progress FIG. 5D shows the time remaining in cooking cycle program FOUR, while FIG. 5E illustrates that the cleaning mode is in progress displaying cookpot temperature. FIG. 15F indicates that the three-digit access code may be entered for program TWO. FIG. 15G shows that the initial start-up temperature has been reached in program FIVE and that the food may be placed in the cookpot. FIG. 15H indicates that the cooking cycle is completed and that the cookpot can be unloaded.

Figure 15I:
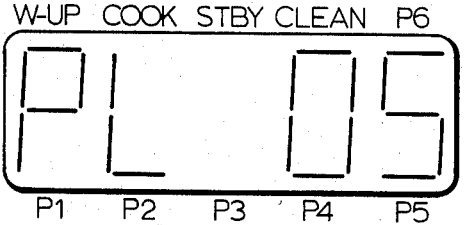
Figure 15J:
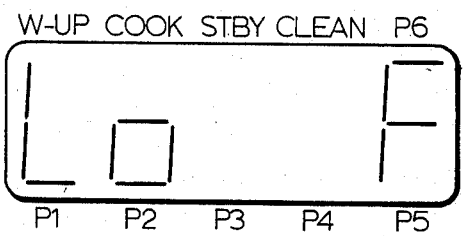

FIG. 15I indicates a power resumption from a power outage and that the cooking status was not lost. This will be discussed further hereinafter. FIG. 15J shows that the cooking-oil temperature has dropped below 79.44° C.

Other displays are also provided to indicate that one of several system tests is in progress, to indicate that the random access memory of the microprocessor is not being cleaned, etc.

As shown in FIG. 7A, fourteen relays can be driven with the hardware circuitry of the output drive section of the controller; however, only twelve outputs are actually needed for the preferred embodiment described herein. The relay board 20 interfaces the controller to the cooker and is positioned in the cooker console. Five of the twelve relays provide coil voltage to larger higher current contactors for the heaters, pump, and lid motor. The seven remaining relays control motor-driven and solenoid-activated valves directly.

A conductor cable shown schematically at 21 in FIG. 1 connects the remote controller to the cooker providing I/O connections to the relay board, power lines, lines for the RTD sensor, and a spare line.

The wait input section consists of a noise-filtering input section 271 (FIG. 4) comprised of five ferrite bead assemblies 272 (FIG. 6B) with five bypass capacitors 273 to chassis ground and a quad opto-isolator 274. A voltage entering the filter section from the relay board is half wave and low current and is applied across an input of 274 where it drives an opto LED that, in turn, activates its open collector output drive and pulls the output line low that goes to NAND gates 276. Diodes 277 are blocking diodes to prevent reverse voltage from damaging the LED inputs of opto-isolator 274. The NAND gate array 276 is enabled by a RD and S2 enable line when the microcomputer 201 is ready to read the wait inputs. The output data of 276 is applied to the data bus 280.

Four separate DC voltages are provided on the controller board to power logic chips, displays, memory, processor, and outputs. The +5 VDC supply 283 (FIG. 4) is regulated by a regulator 282 using integrated circuit 233 (FIG. 8A) and associated circuitry. The +5 VDC supply provides power to the majority of logic gates and the microprocessor. An unregulated and unfiltered $V_R$ supply 284 is used to supply relay power to nonsolid state relays, and an unfiltered +12 VDC supply line is used to power solid state relays, if used. Power transistor 278 (FIG. 8A) is part of a series-pass regulator circuit 286 that provides +30 VDC and +21 VDC on lines 287 and 288, respectively. The +30 VDC supplies the source drivers of the display and the +21 VDC is applied to memory 204 pin 1 where it is used to generate the $V_{PP}$ pulse for a memory write operation.

The transformer 261 incorporates a dual primary winding to allow the use of 208 VAC or 240 VAC, one-phase input voltages, depending upon the cooker power requirements.

As alluded to previously, one important capability of the cooking system according to the present invention is that a number of different cooking cycles, each having a unique time and temperature profile, can be programmed into the controller 201 via the keyboard 205. In the preferred embodiment described herein, the system has been given the capability of storing up to six unique cooking cycle programs with each program having up to eight different time and temperature setpoints. During a cooking cycle, the controller 201 will regulate the heating elements 15 in accordance with the demand generated by calculating the desired temperature according to the programmed temperature/time profile and comparing it against the actual measured temperature of the oil in the cooker. The proportion of heater power necessary is determined by computing the temperature and the programmed setpoint temperature at a given time in the heating cycle. As the oil temperature approaches the setpoint temperature value, but has not exceeded that value, the heater elements will be on full power until the oil temperature is within 1.41° C. of the setpoint temperature; and then the power to the elements will be limited until the setpoint temperature is actually reached. Heater power will be off when setpoint temperature is reached or exceeded.

An important feature of the invention is that the eighth setpoint has been given priority over all other setpoints. When used, it will determine the cooking length of the program selected and the ending temperature. For example, if setpoint eight is programmed for a time less than any of the previous setpoints in the cycle, the controller will skip all those setpoints having times greater than the eighth setpoint and will continue cooking only until the eighth setpoint time is reached.

This feature permits the operator to lengthen, shorten, or change the ending temperature of any particular cooking cycle without it being necessary to alter the first seven setpoints of the program. It also permits fast changes to be made in a cooking cycle, even while it is in progress.

This is an important capability for a number of reasons. For one thing, it is known that people's taste for a food such as chicken differ somewhat in different geographic areas. Some areas may like soft, slightly moist chicken, but also prefer some degree of crispness. The alternate setpoint permits an operator to increase the temperature at the end of the cooking cycle to provide the desired crispness without it being necessary for the overall cooking cycle program to be altered. When using the alternate setpoint in this manner, it is only necessary to clear the alternate setpoint location to allow the original ending temperature to be used. Again, no reprogramming of the original program is necessary.

The alternate setpoint can also be effectively used when an existing cooking cycle needs to be lengthened or shortened slightly, for example, to cook a product that requires a longer or shorter cooking cycle than has been preprogrammed but where the preprogrammed cycle is otherwise appropriate.

Also, if desired or necessary, the alternate setpoint alone can be used to determine the temperature level for an entire cooking cycle when cooking a crispy product.

Figure 9:
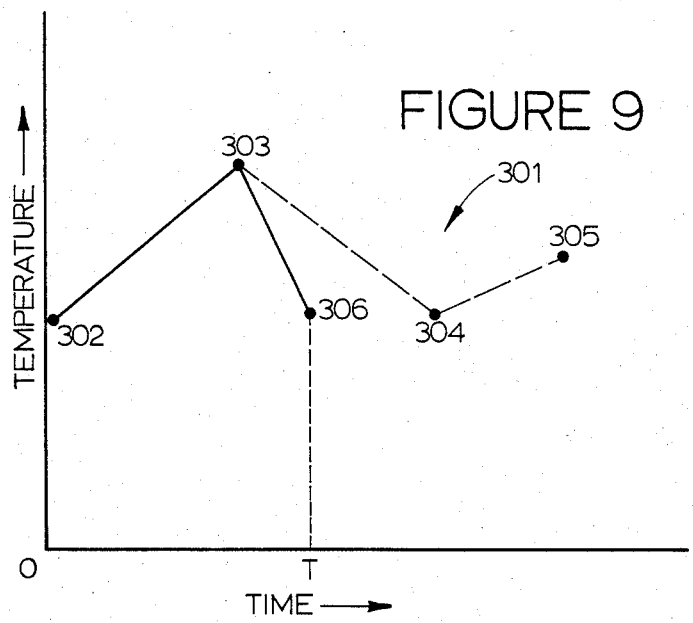
FIG. 9 graphically illustrates a typical cooking cycle that might be programmed into the controller of the present invention.
Figure 14:
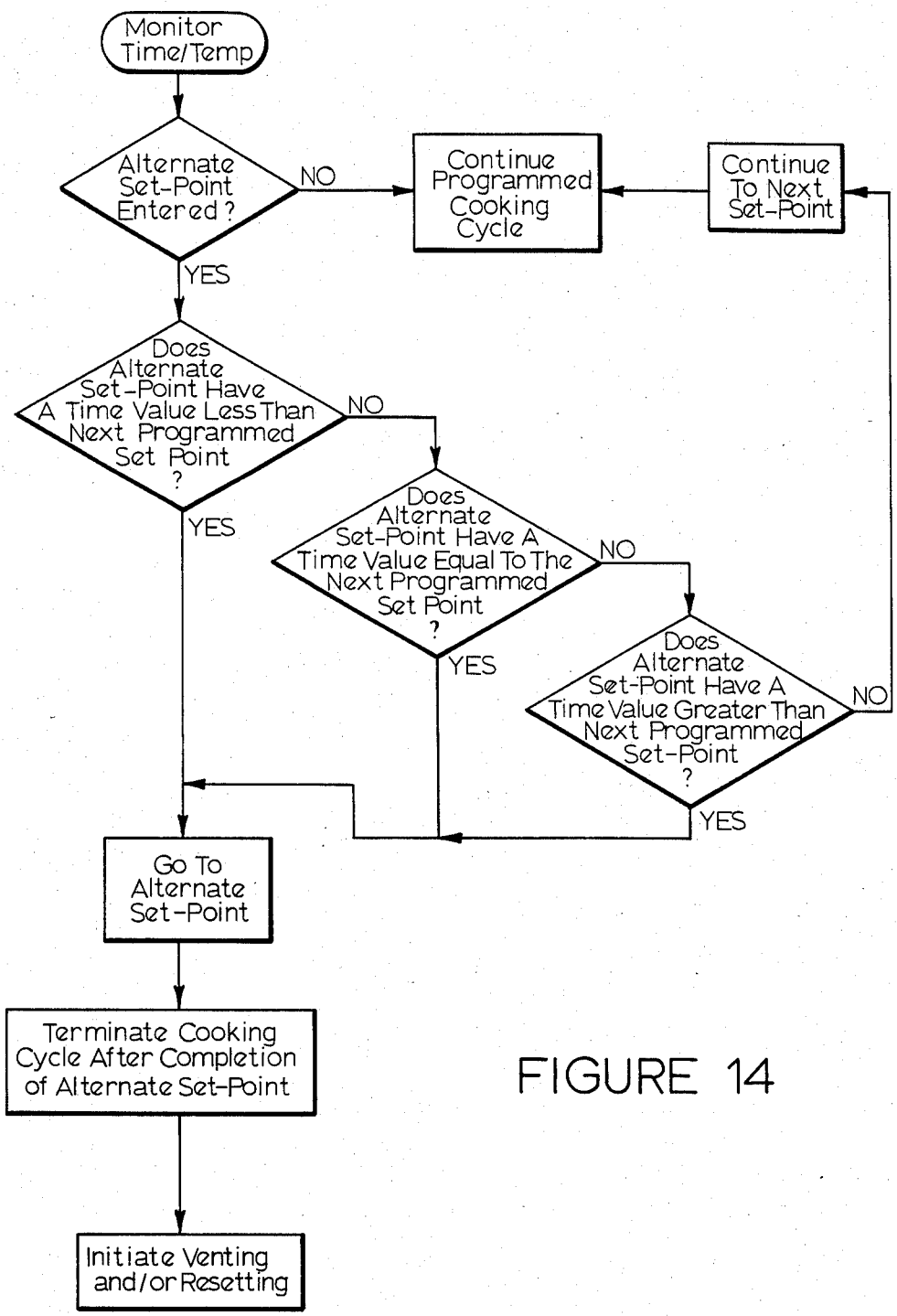
FIGURE 14 is a flow chart illustrating the manner by which the insertion of an alternate setpoint into a cooking cycle can be utilized to change the cooking cycle.

FIGS. 9 and 14 are provided to help explain this feature. Specifically, FIG. 9 graphically illustrates a cooking program 301 normally consisting of four setpoints 302, 303, 304, and 305, each having a specific time and temperature setting. Without any alteration, the program will carry the cooking cycle from setpoint to setpoint until it reaches final setpoint 305 after which time the lid will raise and a signal will be given to the operator to remove the food from the cookpot.

By inserting alternative setpoint 306 which has a time which is less than the time of point 304, however, the cycle will, after setpoint 303, go to the alternate setpoint 306 instead of to setpoint 304.

FIG. 14 illustrates a flow chart to further explain this important feature.

Another feature of the invention relates to the heating elements 15 themselves. They are divided into two groups: one of four elements which provides two-thirds of the heat and a second group of two elements which provides one-third of the heat. An algorithm in the software switches on full heat until the oil temperature in the cookpot is within a few degrees (i.e., 1.41° C.) of the setpoint temperature at which time the first group of heaters is switched off and the second group of only two heaters is cycled on and off. This scheme allows finer control over the cooking temperature and cycling of only two heaters reduces wear and tear on the heater contactors.

Yet a further feature of the invention is that the system is provided with a built-in capability of advising the operator when the cooking oil needs to be changed. Specifically, laboratory testing determines the number of cooking rounds that are possible or desirable before the oil needs to be changed; and this number is preset into the program memory of the controller. After each completed cooking round, the count is incremented and compared against the reference total. Once the reference count has been exceeded, the controller will display "CHSH" prior to any attempt to initiate a new cooking cycle. This display can be cleared, however, and warm-up initiated by the operator by just depressing the program selection previously entered. After the cooking oil has been changed, the total count can be reset to zero by the operator by using the TIME, ZERO and ENTER keys.

While what has been described above constitutes a presently preferred embodiment, it should be understood that a great many changes and modifications could be made without departing from the spirit and scope of the invention and without diminishing its attendant advantages. It is therefore intended that such changes and modifications be covered by the following claims.

I claim:

1. A cooking system including cooking means for cooking a food product and control means for controlling the cooking of said food product by said cooking means, said control means including means for cooking said food product pursuant to a particular cooking cycle, said cooking cycle being defined by a plurality of time/temperature setpoints each of which specify that the cooking temperature be at a particular value at a particular time during the cooking cycle, characterized in that said control means (201) further includes means for inserting an alternate time/temperature set point into said cooking cycle for replacing the setpoints in said cooking cycle which have a time or a temperature value that is greater than that of said alternate setpoint.

2. A cooking system as recited in claim 1 wherein said plurality of time/temperature setpoints comprise from two to seven setpoints.

3. A cooking system as recited in claim 1 wherein said cooking means comprises a deep-fryer cooker and wherein the temperature settings of said plurality of time/temperature set points define the temperature of the cooking oil (9) within which said food product is cooked.

4. A cooking system as recited in claim 3 wherein said system cooking means and control means are adapted for a food product comprising fried chicken.

5. A cooking system as recited in claim 1 and further including means for preventing the loss of data defining a particular cooking cycle in progress in the event of a loss of power interrupting said cooking cycle, said preventing means comprising data storage means (201), means for transferring said data to said data storage means, and standby energy storage means (238) for supplying energy to said data storage means.

6. A cooking system as recited in claim 5 wherein said data storage means (201) comprises volatile data storage means, and wherein said energy storage means (238) comprises means for supplying energy to said volatile storage means for a limited period of time.

7. A cooking system as recited in claim 6 wherein said limited period of time comprises approximately two minutes.

8. A cooking system as recited in claim 6 and further including means for resuming the interrupted cooking cycle upon a resumption of power to said cooking means before the expiration of said limited period of time, and means for preventing the resumption of said interrupted cooking cycle if the cooking temperature has dropped by more than a predetermined amount during the period of said interruption.

9. A method for cooking a food product including the steps of providing a cooking cycle by which said food product is to be cooked, said cooking cycle including a plurality of time/temperature setpoints each of which specify that the cooking temperature be at a specified value at a specified time during said cooking cycle; characterized in that the method further includes the step of inserting an alternate time/temperature setpoint into said cooking cycle for replacing all setpoints in said cooking cycle which have a time or a temperature greater than that of said alternate time/temperature setpoint.

10. A method as recited in claim 9 wherein said providing step comprises the step of selecting a desired cooking cycle from among a plurality of cooking cycles.

11. A method as recited in claim 9 wherein said inserting step comprises the step of inserting said alternate time/temperature setpoint while said cooking cycle is in progress.

12. A method as recited in claim 9 wherein said step of providing a cooking cycle comprises providing a cooking cycle program by which said food product is to be cooked and wherein said inserting step comprises the step of inserting said alternate time/temperature setpoint without modifying said cooking cycle program.

13. A method for cooking a food product including the steps of providing a cooking cycle program according to which said food product is to be cooked, said cooking cycle program being defined by a plurality of time/temperature setpoints, each of which specify that the cooking temperature be at a specified value at a specified time during the cooking cycle; and cooking said food product pursuant to said cooking cycle program, characterized in that said method further includes the step of replacing one or more of said time/temperature setpoints of said cooking cycle with an alternate time/temperature setpoint to change said cooking cycle without changing said cooking cycle program.

14. A method as recited in claim 13 wherein said replacing step comprises the step of replacing the ending time or the ending temperature of said cooking cycle.

15. A method as recited in claim 13 wherein said providing step comprises the step of selecting said cooking cycle from among a plurality of preprogrammed cooking cycles.

16. A method as recited in claim 13 wherein said replacing step is performed while said food product is being cooked.

17. A cooking system including cooking means for cooking a food product and control means for establishing a cooking cycle for said food product by said cooking means, said control means including means for cooking said food product pursuant to a preprogrammed cooking cycle program, characterized in that said control means (11) includes means for changing said cooking cycle without modifying said preprogrammed cooking cycle program; said preprogrammed cooking cycle program is defined by a plurality of preprogrammed time/temperature setpoints (302, 303, 304, 305), each of which specify that the cooking temperature be at a particular value at a particular time during said cooking cycle; and said means for changing said cooking cycle comprises means for inserting an alternate time/temperture setpoint (306) into said cooking cycle for replacing those preprogrammed time/temperature setpoints which have a time or a temperature value that is greater than that of said alternate setpoint.

* * * * *